United States Patent [19]

Sodergren et al.

[11] Patent Number: 4,513,786
[45] Date of Patent: Apr. 30, 1985

[54] MECHANICAL TUBE PLUB

[75] Inventors: Jan H. Sodergren; James W. Hales, both of Harrison, Tenn.

[73] Assignee: Combustion Engineering, Inc., Windsor, Conn.

[21] Appl. No.: 484,742

[22] Filed: Apr. 14, 1983

[51] Int. Cl.³ .............................. F16L 55/10
[52] U.S. Cl. ...................... 138/89; 29/523; 165/76
[58] Field of Search .............. 138/89, 93, 97, 98; 29/507, 520, 523, 525; 165/71, 76; 376/203

[56] References Cited

U.S. PATENT DOCUMENTS

| | | | |
|---|---|---|---|
| Re. 30,802 | 11/1981 | Rogers | 138/98 X |
| 3,036,374 | 5/1962 | Williams | 29/523 X |
| 3,590,877 | 7/1971 | Leopold et al. | 138/89 |
| 3,691,609 | 9/1972 | Ice et al. | 138/89 X |
| 3,919,940 | 11/1975 | Ploger et al. | 138/97 X |
| 4,178,966 | 12/1979 | Savor et al. | 138/89 |
| 4,262,187 | 4/1981 | Savor | 219/136 X |

*Primary Examiner*—James E. Bryant, III
*Attorney, Agent, or Firm*—Robert L. Olson

[57] ABSTRACT

Apparatus as provided for plugging a tube end in such a manner that the plug can be later removed. The apparatus includes a hollow plug (10) closed at the end (12) inserted into the tube (20) and open at its other end. The plug has a band (18) of ductile metal (gold, silver, or pure iron) on its outer surface which is extruded into any crevices caused by irregularities in the inner wall surface of the tube when the plug is mechanically expanded into the tube. The plug has a portion near its outer end of slightly enlarged diameter (14) to provide a light interference fit with the tube to hold the plug in place prior to and during the expanding step.

1 Claim, 2 Drawing Figures

MECHANICAL TUBE PLUB

BACKGROUND OF THE INVENTION

In tube-and-sheet heat exchangers, for example those used in a nuclear steam generator, problems are encountered in the form of tubes which become defective or damaged. These tubes are generally effectively removed from operation by plugging both ends of the tubes during a maintenance shutdown and continuing the operation of the steam generator with only the remaining tubes in operation. One means used in the past for plugging the tubes was by welding a plug into each of the tube ends, as disclosed in U.S. Pat. No. 4,262,187, which issued on Apr. 14, 1981.

This works fine until a point is reached where there are so many tubes plugged that there is insufficient capacity left for continued practical operation of the steam generator. Then the unit is normally taken out of operation altogether and replaced with an entire new steam generator. Since the cost of replacing an entire steam generator is extremely high, other means of handling the situation is presently being considered. One means is to plug the tubes by means of plugs which can be readily and easily removed at a later time. Thus when too many tubes have been removed from operation, the unit can be shut down, the plugs can be removed, and the tubes can be thoroughly inspected and tested to see which tubes can be effectively repaired, for example by sleeving. If enough tubes can be repaired, the useful life of the steam generator can be greatly extended.

SUMMARY OF THE INVENTION

The present invention is directed to apparatus for effectively plugging a defective tube by means which can be later removed. This is accomplished by means of a hollow plug which is closed at the end inserted into the tube. The plug is inserted into the tube with its outer end flush with the tube end. A seal between the two members is obtained by increasing the plug diameter by using mechanical rolls. Hydraulic or pneumatic pressure could also possibly be used in place of the mechanical rolls. Many times the inner wall of the tube has irregularities on its surface, such as longitudinal scratch marks, which prevent a perfect seal. In accordance with the invention, a thin band of ductile metal (gold, silver, or pure iron) is provided on the portion of the tube plugs which is expanded. The ductile metal is thus extruded into any crevices or irregularities in the inner tube wall surface, thus forming a perfect seal.

DESCRIPTION OF THE PREFERRED EMBODIMENT

Figure 1:
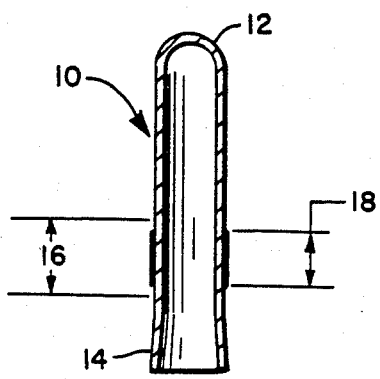
FIG. 1 is a sectional elevation of a tube plug constructed in accordance with the invention.

Looking now to FIG. 1, numeral 10 indicates the tube plug in its entirety. This plug can be used to removably seal the end of a defective or degraded tube in a nuclear steam generator. These tubes are commonly made of an Inconel alloy, and the tube plug is also of an Inconel alloy. The tube plug is closed at its inner end 12, which is the end inserted into the degraded or defective tube.

The tubes, and thus also the tube plugs, are generally of small diameter (¾ inch) as steam generating tubes go. The plug 10 is approximately 5 inches in length, and would be slightly less than ¾ of an inch OD throughout most of its length, if the degraded tube had ¾ of an inch ID. The outer end 14 of the plug should be slightly larger than ¾ of an inch, to provide a light interference fit to hold the plug in place prior to and during rolling. The plug will be rolled, or otherwise expanded, for a length of approximately 1¼ inches, shown at 16 in FIG. 1. In order to provide a better seal between the plug and tube, a narrow band of ductile metal is plated onto the tube plug, as indicated by numeral 18 in FIG. 1. This band may be approximately ½ inch wide, and 2-4 mils thick. Suitable ductile metals would be gold, silver, and pure iron. The portion 16 of the plug which is expanded into the tube includes and overlaps on both sides of the band of ductile metal 18. Thus during the plug expanding step of the process, the ductile metal is extruded into all of the crevices caused by surface irregularities, such as scratches, thus forming a positive seal. This is of the utmost importance in a nuclear steam generator, since the primary fluid of the heat exchanger is radioactive, whereas the secondary fluid is not. It is highly desirable to prevent intermixing of these fluids.

Figure 2:
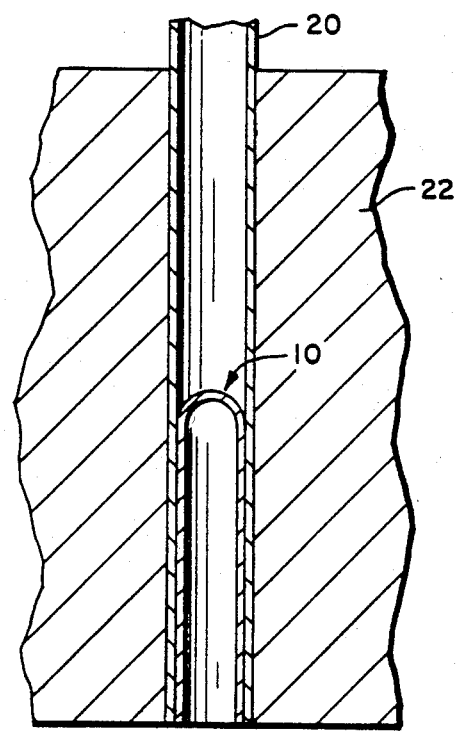
FIG. 2 is a partial sectional elevation of a tube-and-sheet heat exchanger showing a tube plug expanded into place in the end of one of the tubes.

FIG. 2 shows a tube plug 10 after it has been expanded into place in a defective or degraded tube 20. Numeral 22 indicates the tube sheet of a nuclear steam generator to which the ends of a plurality of U-shaped tubes 20 are secured. During operation of the steam generator, some of these tubes become defective or degraded and must be plugged. The plug 10 is positioned in the defective tube 20 with the plug end 14 flush with the face of tube sheet 22. The enlarged end 14 has a slight interference with tube ID to hold the plug in place prior to and during the rolling procedure.

Any suitable rolling apparatus can be used for expanding the plug in place. A typical mechanical tube expander may have a plurality of rolls held loosely in a cage or housing. A tapered mandrel moves longitudinally through the housing, camming the rolls radially outwardly into engagement with the walls of the plug. Further longitudinal movement causes expansion of the plug. It should also be mentioned that an expanding device could also be used which would utilize hydraulic or pnuematic pressure. The expansion causes the ductile metal to be extruded and flow into any crevices caused by surface irregularities, so that a good seal is formed. A plug such as described above is placed in each end of every defective tube.

The tube plugging can be done during any maintenance shutdown of the steam generator. The unit can thereafter be placed back into operation, with the plugged tubes remaining out of operation as heat exchange surface. After a large number of tubes have been plugged, the time may come when it is necessary to unplug some of the tubes and repair them in order to continue to operate the steam generator effectively. The tube plugs of the invention can be readily removed by heat shrinking. A heating device, such as an electric induction device, can be inserted into the plug interior to heat the metal to a high temperature. After cooling, the plug either slides out or can be pulled out of the tube by a 10 to 20 pound force from a special gripping tool which grips the plug by its ID wall surface. The tube can then be tested and sleeved if it is repairable, so as to be operative as heat exchange surface when the unit is again put back into operation.

We claim:

1. Apparatus for removably sealing the end of an Inconel tube whichis thereby removed from service in a heat exchanger, including a hollow Inconel plug which can be inserted into the end of a tube, said plug having a substantially non-varying outer diameter throughout the major longitudinal portion located within the tube of slightly smaller diameter than that of the tube, said plug having a first closed end which enters the tube, and a second open end adapted to be flush with the tube end, a portion of plug near the second end being of slightly larger diameter to provide a light interference fit in the tube to hold the plug in place prior to and during the expansion thereof, and a band of ductile metal on a portion of the outer diameter of the plug, said band being approximately 2–4 mils thick, and being of either gold, silver, or pure iron, such that when the plug is expanded into tight engagement with the tube, the ductile metal is extruded into any crevices caused by irregularities in the inner wall surface of the tube.

* * * * *